United States Patent [19]

Reindl

[11] 4,053,712

[45] Oct. 11, 1977

[54] ADAPTIVE DIGITAL CODER AND DECODER

[75] Inventor: Adolf Reindl, Ocean Township, N.J.

[73] Assignee: The United States of America as represented by the Secretary of the Army, Washington, D.C.

[21] Appl. No.: 717,732

[22] Filed: Aug. 24, 1976

[51] Int. Cl.² .......................... G10L 1/06; H04N 1/38
[52] U.S. Cl. .............................. 179/15.55 T; 358/261
[58] Field of Search ................. 179/15.55 T, 15.55 R, 179/15 AS, 15 AP, 15 BW; 358/134, 261; 325/38 B

[56] References Cited

U.S. PATENT DOCUMENTS

| | | | |
|---|---|---|---|
| 3,851,106 | 11/1974 | Jacobaeus | 179/15 AP |
| 3,935,379 | 1/1976 | Thornburg | 358/261 |
| 3,988,674 | 10/1976 | Sciulli | 179/15 BS |

Primary Examiner—Kathleen H. Claffy
Assistant Examiner—Kenneth A. Chayt

Attorney, Agent, or Firm—Nathan Edelberg; Sheldon Kanars; Bernard Franz

[57] ABSTRACT

An adaptive coder and decoder for reducing the bit rate required to transmit digitally encoded speech signals. The invention relies on the fact that the speech pattern of the average talker contains significant numbers of inter-syllable and inter-word pauses. The coder includes circuitry that monitors the idle pattern code generated by the coder's analog-to-digital converter and a code word generator that generates one or more special code words that are substituted for idle pattern code sequences of predetermined length. The speech signal and special code words are then fed into an elastic buffer and transmitted to the distant receiver at a lower bit rate than was employed for the encoding process. At the receiving location, the decoder recognizes the special code words, substitutes an idle pattern bit stream of the appropriate length for the code words and then reads-out the contents of an elastic input buffer at a higher bit rate than was used to transmit the incoming signal, that is, at the same bit rate as was initially used at the coder.

12 Claims, 11 Drawing Figures

ADAPTIVE DIGITAL CODER AND DECODER

GOVERNMENT LICENSE

The invention described herein may be manufactured and used by or for the Government for governmental purposes without the payment of any royalties thereon or therefor.

BACKGROUND OF THE INVENTION a. Field of the Invention

Broadly speaking, this invention relates to telecommunications. More particularly, in a preferred embodiment, this invention relates to methods and apparatus for processing digitized human speech to reduce the bit rate required to transmit the information signal over a digital telecommunications link.

b. Discussion of the Prior Art

In recent years, considerable attention has been focused on digital transmission and switching systems. Such systems are in many ways superior to the analog systems heretofore employed and offer the further advantage that the digital signal may be encrypted prior to transmission, an important fact where security is of concern.

Since human speech is analog in nature, it is necessary to employ some form of analog-to-digital conversion prior to transmission over the digital system. Several approaches have been employed in prior art including the so-called "wideband" and "narrowband" conversion techniques. The "wideband" techniques include pulse code modulation (PCM), which results in an output bitstream, say, at a 48 or 64 kb/s rate, or delta modulation, for example, Continuously Varying Slope Delta Modulation (CVSD) which resuls in an output bitstream at a 32 or 16 kb/s rate.

The "narrowband" techniques include the so-called "VOCODER" approach, or any of several more sophisticated converters which utilize some sort of adaptive or predictive technique. The "narrowband" techniques result in an output bitstream of from 1.2 or 2.4 kb/s to 9.6 kb/s, depending upon the desired voice quality and the particular technique which is used.

The problem is that "narrowband" converters are expensive and the voice quality that they yield, especially speaker recognizability, is marginal at best. The "wideband" converters, especially those employing Delta Modulation, are far more successful, are inexpensive, and deliver good performance at bit rates of 32 kb/s and even 16 kb/s. Unfortunately, these high bit rates limit the number of voice circuits that can be multiplexed over a transmission link of a given bandwidth.

Now, it is a known fact that the speech pattern of the average talker is replete with numerous inter-syllable and inter-word pauses. It is, in other words, highly redundant from an information transfer viewpoint. This redundancy becomes even greater when one considers the fact that at least some of the time the talker is silent while listening to the talker at the other end of the circuit.

SUMMARY OF THE INVENTION

The instant invention, in an illustrative embodiment, operates on the digital output signal of the Delta Modulation A/D converter by applying a coding process thereto which inserts distinct, short code words in lieu of the extended bit patterns which are generated by idle conditions in the input speech signal. This substitution process is followed by bit buffering in order to allow a certain degree of averaging over a given time period, which is controlled by the buffer size. The output of the invention is timed at a clock rate which is lower than the input rate from the A/D converter. Practical values of the reduction of the bit rate are in the order of 2 to 3 (i.e., a 16 kb/s A/D converter bit rate will be reduced for transmission to a rate of 9.6, 8 or 6 kb/s). A similar device is required for the D/A converter at the receiving terminal. There, the received digital bit stream is fed into a buffer whose output is controlled by a decoder which monitors for the special code words previously inserted by the source coder. In the absence of such special code words, the buffer output is timed at the same rate as the output rate of the A/D converter in the distant coder. The buffer output is fed into a D/A converter to produce the analog speech signal. When the decoder recognizes the special code word(s), the buffer output is interrupted and "idle" bit patterns are generated and fed into the D/A converter at the same rate as the bit streams previously delivered from the buffer. The durations of the "idle" bit patterns are controlled by the characteristics of the special code words, as recognized by the decoder. When the "specified" length of the "idle" bit patterns is expired, the decoder again switches the buffer output to the D/A converter at the original clock rate.

The invention and its mode of operation will be more fully understood from the following detailed description, when taken with the appended drawings, in which:

DETAILED DESCRIPTION OF THE INVENTION

The invention will now be described with reference to a specific communications system of the type wherein an analog voice signal is first converted into a digital signal at a 16 kb/s rate, then adaptively encoded for transmission over a digital transmission facility operating at an 8 kb/s rate, and finally decoded at the distant terminal back into a 16 kb/s signal for subsequent reconversion into the original analog voice signal.

One skilled in the art will appreciate that the above system is merely illustrative of many such systems and the invention disclosed herein is suitable for use with transmission facilities and digital signals operating at different bit rates provided, of course, that appropriate changes are made to certain components and circuits of the encoder and decoder, for example, the internal clock circuits, et cetera. Further, the invention is not necessarily restricted to use with voice signals but may also be used with other analog signals having similar characteristics to voice signals.

Figure 1:
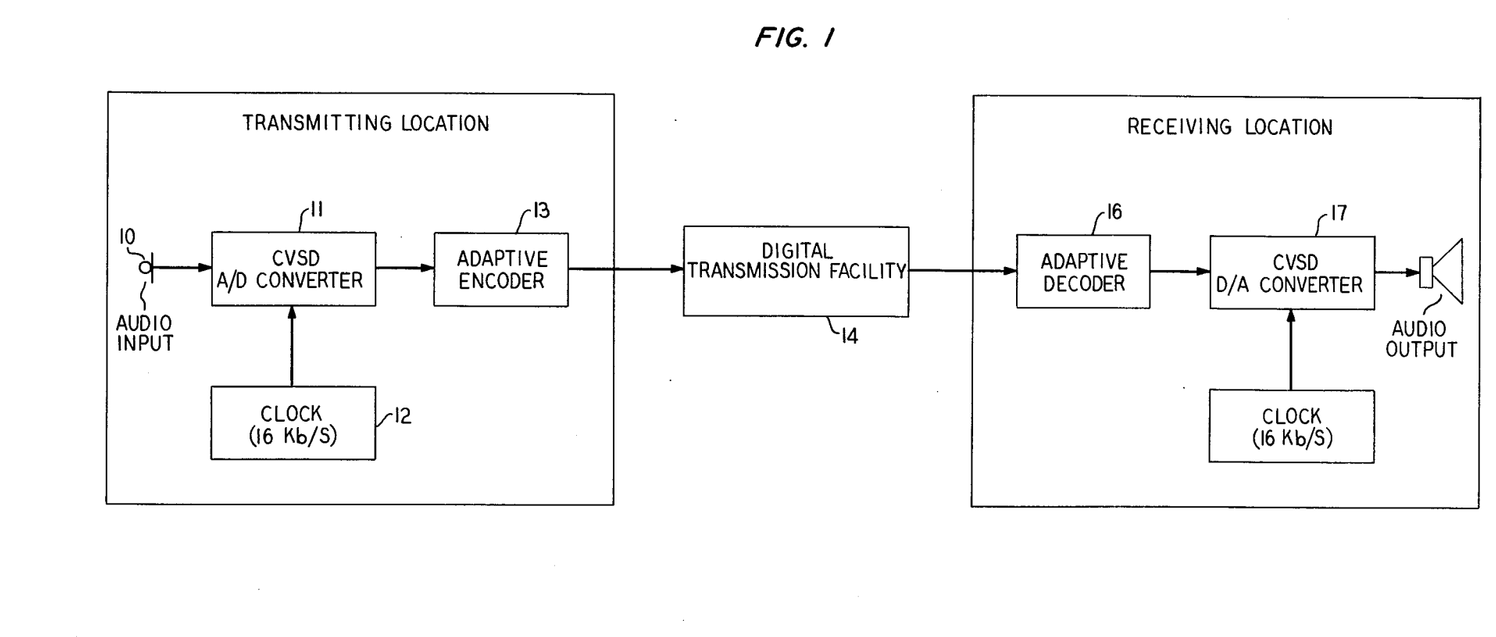
FIG. 1 is a simplified block schematic diagram of an overall transmission system utilizing the adaptive coding process according to the invention.

FIG. 1 illustrates the operating environment for the invention. As shown, an audio signal, illustratively, a voice signal occupying from 300 – 4000 Hz, is applied to a microphone 10 which is connected to the input of a Continuously Variable Slope Delta (CVSD) Analog-to-Digital Converter 11. Converter 11, in turn, is connected to a 16 kb/s clock 12 and to the input of an adaptive encoder 13, which will be described in considerable detail later. The output of encoder 13, which is now at an 8 kb/s rate, is connected to the input of an 8 kb/s digital transmission facility 14, for example, any of the commercially available digital transmission systems or a leased Bell System digital transmission facility.

At the receiving location, the output from transmission facility 14 is connected to an adaptive decoder 16 which converts the incoming 8 kb/s digital signal to a 16 kb/s signal. Decoder 16 will also be described in considerable detail later. The output of decoder 16 is connected to a CVSD Digital-to-Analog Converter which is connected to a 16 kb/s clock 18. The analog output of converter 17 is connected to a transducer 19, for example, a telephone receiver, which recreates the original audio input to microphone 10. To simplify the drawing, only one direction of transmission has been shown. Obviously, for two-way transmission, additional equipment will be required at both ends of the system; however, this is identical to that shown and, thus, need not be discussed in detail.

Figure 2:
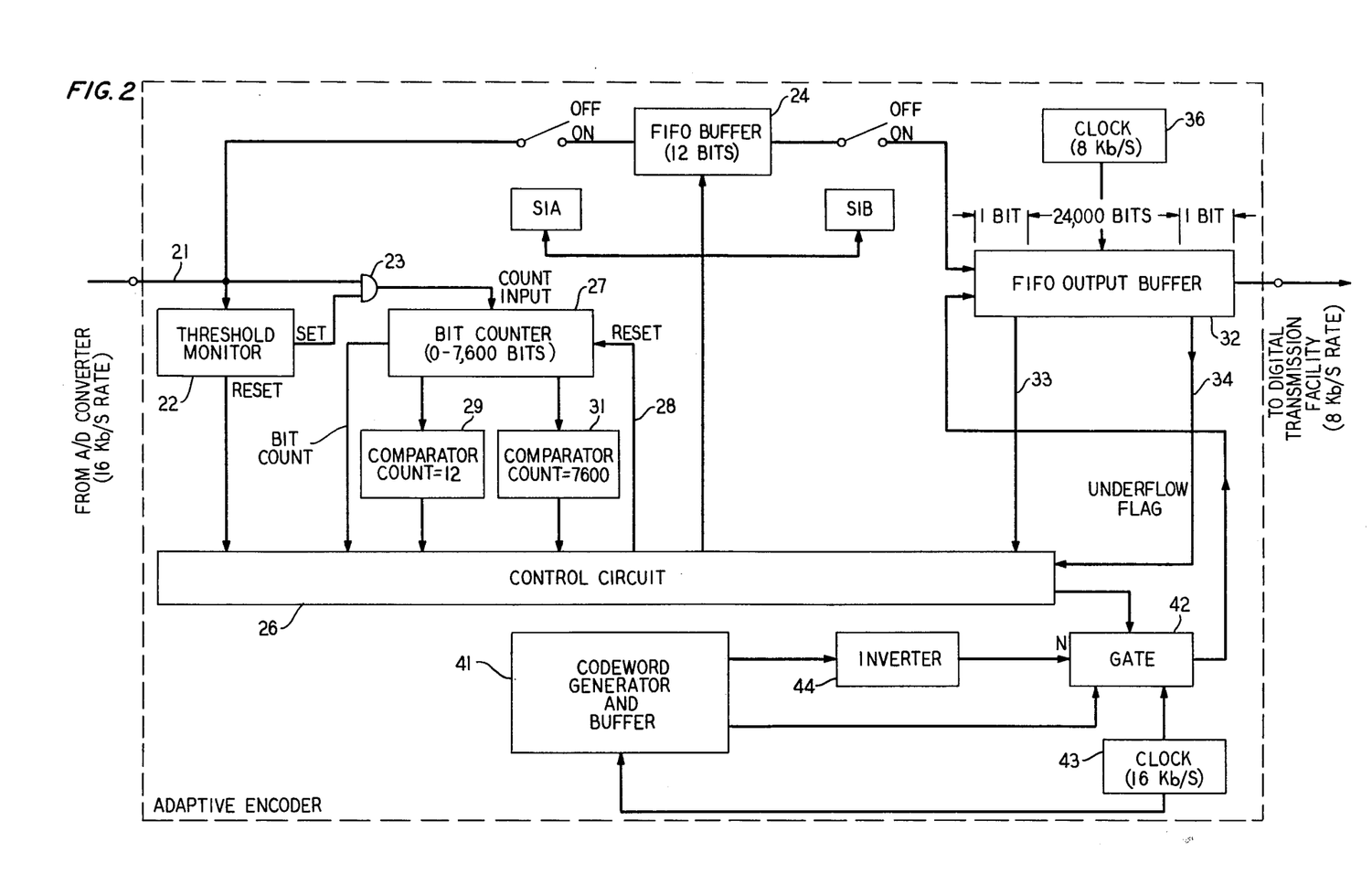
FIG. 2 is a block schematic diagram of the adaptive encoder shown in FIG. 1.

FIG. 2 depicts the circuitry of adaptive encoder 13 in more detail. As shown, the output of A/D converter 11 is applied, via lead 21, to the input of a threshold monitor 22; to one input of an AND gate 23; and, via an electronic switch S1A, to the input of a first-in, first-out (FIFO) buffer 24. The set output of monitor 22 is connected to the other input of AND gate 23 while the reset lead of monitor 22 is connected to a control circuit 26 which will be discussed in greater detail below. The output of AND gate 23 is connected to the counting input of a bit counter 27 having a capacity of 7,600 bit counts in the illustrative example. The output of counter 27 is also connected to control circuit 26 as is the reset lead 28. A pair of comparitor circuits 29 and 31 connected between bit counter 27 and control circuit 26 respectively indicate to the control circuit when the count in counter 27 has reached 12 bits or 7,600 bits, its maximum count.

The output of the 12 bit FIFO buffer 24 is connected, via an electronic switch S1B, to the input of a FIFO output buffer 32. Buffer 32 has a capacity of 24,000 bits in the illustrative embodiment with the first and last bit positions being used to derive an "overflow" flag signal and an "underflow" flag signal on leads 33 and 34, respectively. Buffer 32 is also connected to the output of an 8 kb/s clock 36.

As will be explained below, upon command from control circuit 26, switches S1A and S1B are moved to the "off" or open position and in this condition, a code word generator and buffer 41 generates from 1 to 4 special code words which are connected to the input of buffer 32 via a gating circuit 42. Gate 42 and code word generator 41 are connected to a 16 kb/s clock 43. An inverter 44 is connected between code word generator 41 and gate 42 to produce an inverted, or "negative" version of the code word (or words) generated by generator 41. The output of encoder 13 is taken from the output of FIFO buffer 32 at the rate of 8 kb/s.

Figure 3A:
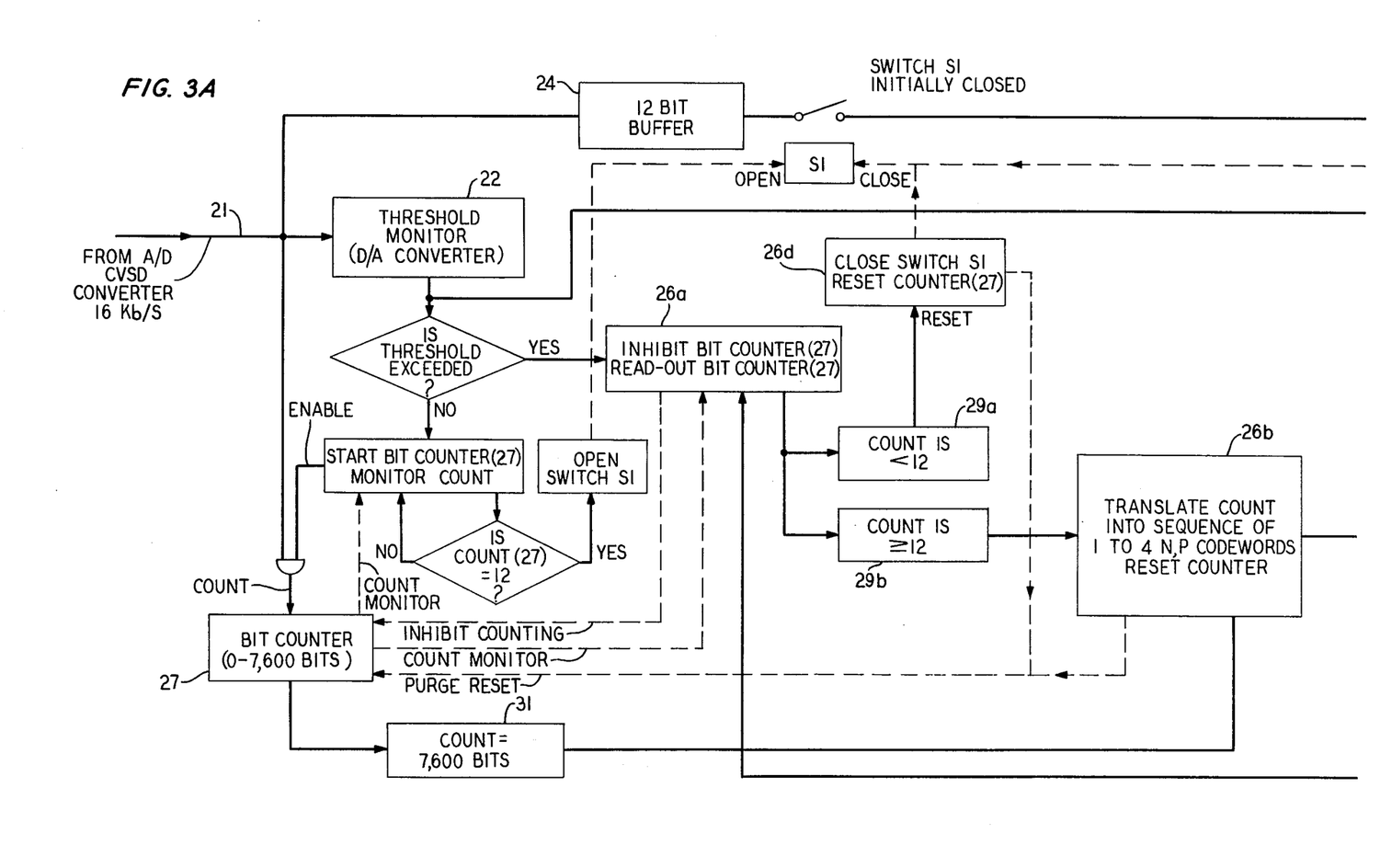
FIGS. 3A and 3B show a partially block schematic, partially functional flow diagram illustrating the operation of the encoder shown in FIG. 2.
Figure 3B:
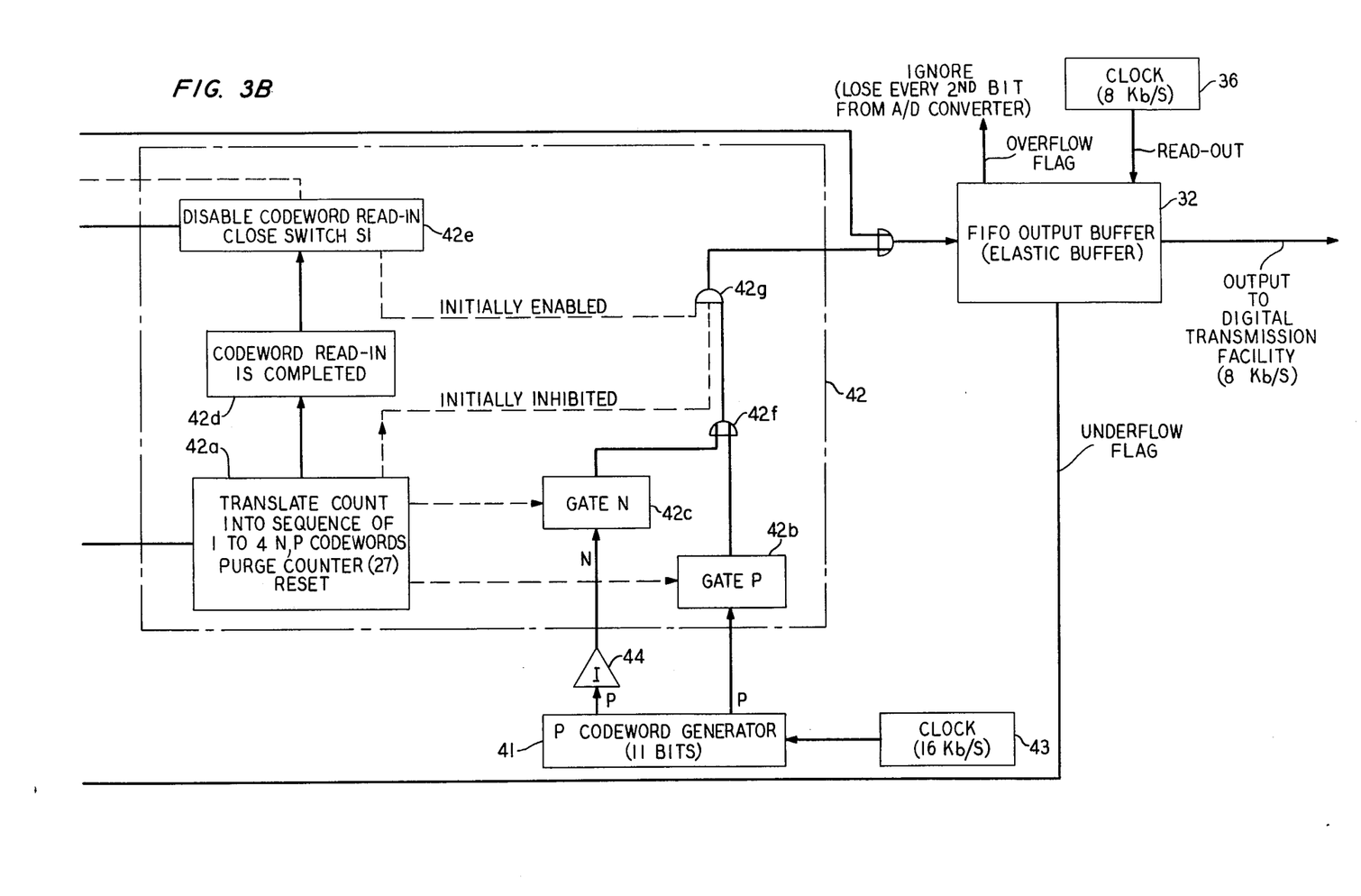
Figure 4:
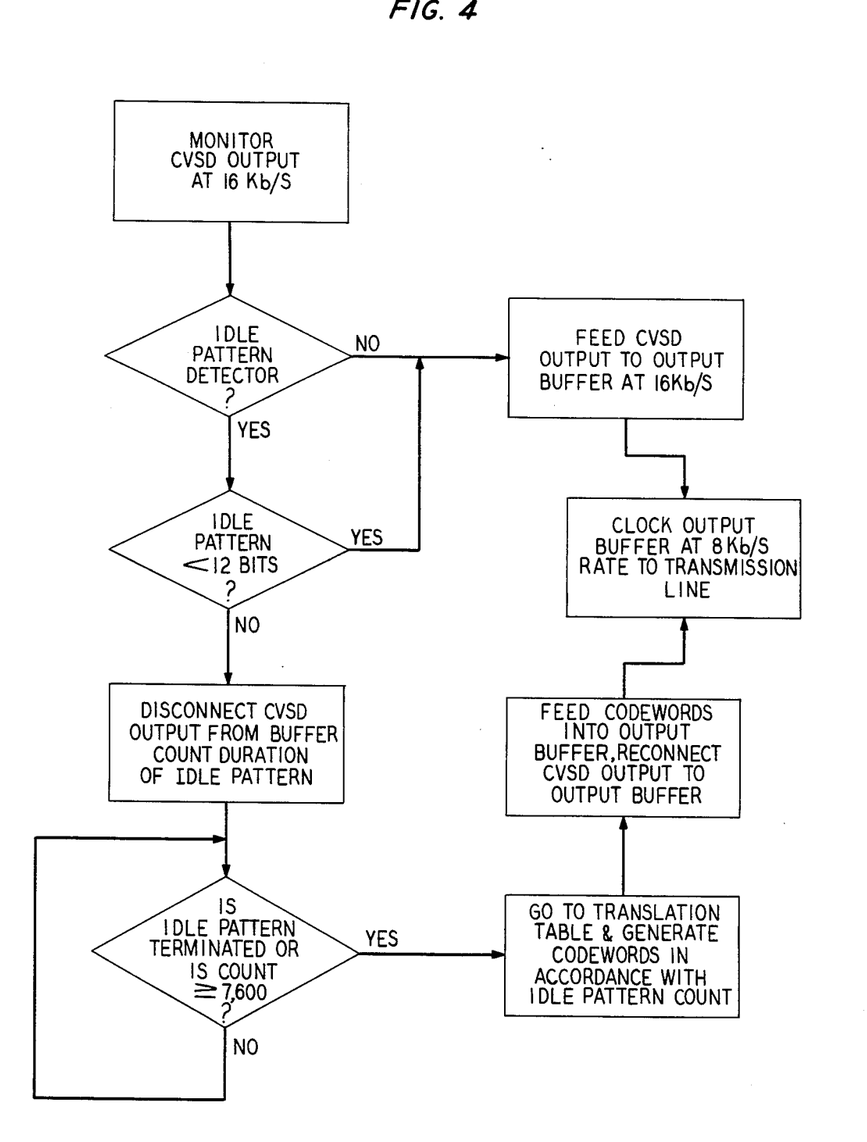
FIG. 4 is a flow-chart illustrating the processing steps that the digital bit stream undergoes in the encoder shown in FIGS. 2 and 3.

The operation of adaptive encoder 13 will now be described in detail. This explanation will best be understood by reference to FIG. 3, which repeats the basic steps of FIG. 2 and adds additional detail concerning control circuit 26, as well as flow-charting certain of the operational steps that occur in encoder 13 of FIG. 1. FIG. 4, which is a pure flow chart, is also helpful in understanding the invention. It should not be assumed that because a flow chart is given that this invention is a computer program. While any digital encoding and decoding process can be implemented in a general purpose computer, the preferred embodiment of the invention is the hardware configuration shown in FIG. 1. To be sure, the hardware could be implemented in a microprocessor or, by the use of LSI, in one or more integrated circuit chips but the circuit diagram would remain essentially as shown in FIG. 1.

As previously discussed, the input to encoder 13 comprises the output of CVSD A/D converter 11, i.e., a digital bitstream having a constant bit rate of 16 kb/s. When speech input is present at microphone 10, the input bitstream is composed of binary "1"s and "0"s. In accordance with known principles of operation of a CVSD A/D converter, the occurrence of consecutive "1"s indicates a steep increase in the positive amplitude of the speech signal while a series of consecutive "0"s indicates a steep increase in negative amplitudes. When no speech signal is present, i.e., when the talker is pausing between words or syllables, or while he is listening to the distant talker, the CVSD output is the "idle" pattern comprising, in the illustrative embodiment, a bitstream of alternate "1"s and "0"s, i.e., "1010101010 . . ." or a somewhat disturbed pattern which produces negligible signals levels when fed through a digital-to-analog converter.

The fact that the speech of the average talker contains lengthy periods of inter-syllable or inter-word pauses, represented by the above-described "10101010 . . ." "idle" pattern, is utilized in the invention to reduce the digital bit rate required to transmit the speech from 16 kb/s to, say, 8 kb/s, in the illustrative embodiment. According to the invention, the CVSD output bitstream is fed to three encoder ports; (1) threshold monitor 22; (2) the 12-bit FIFO buffer 24; and (3) bit counter 27, via AND gate 23. The threshold monitor reconstitutes the digital CVSD bitstream and through a digital-to-analog CVSD converter and thus generates positive and negative-going analog signals. Monitor 22 is basically a CVSD receiver or integrator with level thresholds which are set at moderate positive and negative amplitudes. These threshold levels will not be reached so long as the CVSD output bitstream represents essentially the idle pattern, i.e., during inter-syllable or inter-word talker pauses. Amplitude swings which are confined between the preset level thresholds cause monitor 22 to generate a d.c. "set" signal which enables AND gate 23 and hence bit counter 27. Thus, whenever the "idle" speech condition is present in the CVSD output bitstream, the bitstream is routed to bit counter 27 which then counts the number of bits in the "idle" pattern. On the other hand, the "set" signal is replaced by a "reset" signal when the integrated CVSD output signal exceeds the preset analog amplitude levels. This occurs when the talker resumes speech. The "reset" signal is applied to control circuit 26 and causes the control circuit to read-out the current count in counter 27 followed by the application of a reset signal to counter 27.

It has priorly been determined that an "idle" pattern of less than 12 bits, i.e., slightly less than 1 millisecond at a 16 kb/s rate, is too short a pause to warrant encoding and decoding action; accordingly comparator 29 of FIG. 2 is connected to bit counter 27 and generates an output signal to control circuit 26 if, and only if, at least 12 bits are detected as having been fed into bit counter 27.

Switches S1A and S1B are normally closed, thus the CVSD bitstream that was fed into monitor 22 and bit counter 27 is also fed into buffer 24, thence, into output buffer 32 which has a capacity of 24,000 bits, or about 1½ seconds of speech at a 16 kb/s rate. As will be shown, the instant invention assumes, on the basis of experimental analysis that within that 1½ second interval the average talker will have at least one, and typically many, inter-syllable or inter-word pauses in his speech pattern.

Returning to bit counter 27, if the incoming bitstream comprises the "idle" pattern and comparator 29 (29b in FIG. 3) determines that the idle pattern is at least 12 bits long, the contents of buffer 24 is purged by control circuit 26 and the input and output of buffer 24 are disconnected by setting S1A and S1B to the "off" position. If the idle pattern continues for an unusually long time, say, over 500 msec, the count in bit counter 27 will approach 7,600. If it exceeds 7,600, comparator 27 will signal control circuit 26 to reset counter 27 and the process will continue until monitor 22 again detects an incoming speech signal.

As previously mentioned, if the count in counter 27 is less than 12 bits, S1A and S1B remain "on" and the CVSD bitstream, even though it is the "10101010 ..." idle pattern, will be fed to buffer 32, via the 12-bit buffer 24. On the other hand, if the count in counter 27 exceeds 12 bits, switches S1A and S1B are "opened" and one or more special code words are generated by code word generator 41 and fed into buffer 32 in lieu of the CVSD output bitstream.

The special code words employed in this invention are correlation code words, each 11 bits long in the illustrative example. These code words have idealized correlation properties, i.e., when shifted through a code word detector they product a large spike (negatively or positively oriented) if they coincide with the checkword, but have small correlation energy when not in coincidence. A representative code word is "10110111000" which is hereinafter designated as a "1" or "P", for positive, code word. The same code word can be inverted to become a "0" or negative code word, "N". The autocorrelation properties of the illustrative word are: 11, 5, 4, 4, 3, 3, 2, 2, 1, 1, 0. The corresponding average properties of a "buried" code word are: 11, 5.5, 5, 5.5, 5, 5.5, 5, 5.5, 5, 5.5, 5.

Table I below gives a representative translation table for the special code words employed in this invention.

TABLE I

| Codeword Combination (P = "normal" bit sequence (N = "inverted" bit sequence) | # of bits required to transmit codeword(s) | # of redundant bit patterns replaced by special code word(s) lower count-upper count |
|---|---|---|
| P | 11 | 12 – 18 |
| N | 11 | 19 – 28 |
| PN | 22 | 29 – 42 |
| PP | 22 | 43 – 60 |
| NP | 22 | 61 – 90 |
| NN | 22 | 91 – 140 |
| PNP | 33 | 141 – 200 |
| PNN | 33 | 201 – 280 |
| PPP | 33 | 281 – 380 |
| PPN | 33 | 381 – 410 |
| NPP | 33 | 411 – 580 |
| NPN | 33 | 581 – 780 |
| NNP | 33 | 781 – 1010 |
| NNN | 33 | 1011 – 1300 |
| PNPP | 44 | 1301 — 1700 |
| PNPN | 44 | 1701 – 2200 |
| PNNP | 44 | 2201 – 2900 |
| PNNN | 44 | 2901 – 3900 |
| PPPP | 44 | 3901 – 5500 |
| PPPN | 44 | 5501 – 7600 |
| PPNP | 44 | 7601 – 10,000 |
| — | — | — |
| e.t.c. | | |

As can be seen, if the number of redundant bit patterns which are to be replaced by a code word is from 12 to 18 bits long, the above-discussed "P" code word "10110111000" is transmitted to buffer 32, hence, to the distant decoder which, as we shall see, will decode it into a corresponding "idle" pattern of "101010101010". If the redundant bit pattern is from 19 to 28 bits long, the "N" code word, which is the inverse of the "P" code word, is transmitted, and so forth. If the redundant bit pattern is from 5,501 to 7,600 bits long, for example, four special code words are transmitted in a "PPPN" sequence.

It will be evident from the above that the number of bits required to replace "idle" patterns is considerably lower than the length of the "idle" pattern itself. In the worst case, an eleven bit code word replaces from 12 to 18 bits of the "idle" pattern but in the most efficient case, a 44 bit code word (4 × 11) replaces up to 10,000 bits of the "idle" pattern.

It is this "compression" that permits the disclosed encoder to read into FIFO buffer 32 at 16 kb/s and to read out at 8 kb/s. Thus, control circuit 26 determines from the count in counter 27 which code words, or sequence of code words, is to be fed into buffer 32, in accordance with a stored lookup table and gate 42, under control of control circuit 26, feeds the sequence of code words into buffer 32. If the count in counter 27 exceeds 7,600, a "1011" or "PPNP" sequence of code words is automatically generated and counter 27 is reset.

After from 1 to 4 of the special correlation code words have been fed at the 16 kb/s rate into FIFO buffer 32, switches S1A and S1B are put into the "on" position and counter 27 reset. This once again permits the CVSD output bitstream to feed into buffer 32, via buffer 24. Output buffer 32 has a bit capacity of several thousand bits, 24,000 in the illustrative example, to allow for a suitable averaging of the non-reduced and reduced input bit rates. The indicated buffer size allows for delay variations which can range up to 3 seconds delay of the information transfer at the 8 kb/s rate. As previously mentioned, buffer 32 is provided with an "empty" or underflow state flag and a "filled" or overflow state flag. When the "empty" state flag is set, i.e., when only 1 bit remains in buffer 32, bit counter 27 is stopped, the count stored therein is read, one or more special code words are generated and fed into buffer 32, bit counter 27 is reset, and the CVSD output bitstream is permitted to pass through buffer 24 into buffer 32 while the process described above is started all over again.

On the other hand, when the "filled" stage flag is set, i.e., when buffer 32 is filled, buffer 24 is disconnected by opening switch S1 (FIG. 3), thus allowing buffer 32 to be emptied, at the 8 kb/s rate until the overflow flag is reset. This process is continued, that is, every $2^{nd}$ bit from coder 13 is discarded until the process is interrupted by the detection of another "idle" pattern condition in the CVSD output bitstream, which fact causes monitor 22 to seize control again in the described manner.

As mentioned, buffer 32 is fed into the transmission line at the 8 kb/s rate. If the information signal is to be encrypted prior to transmission, the cryptographic equipment would be located at the output of buffer 32 and would also operate at the 8 kb/s rate.

Figure 5:
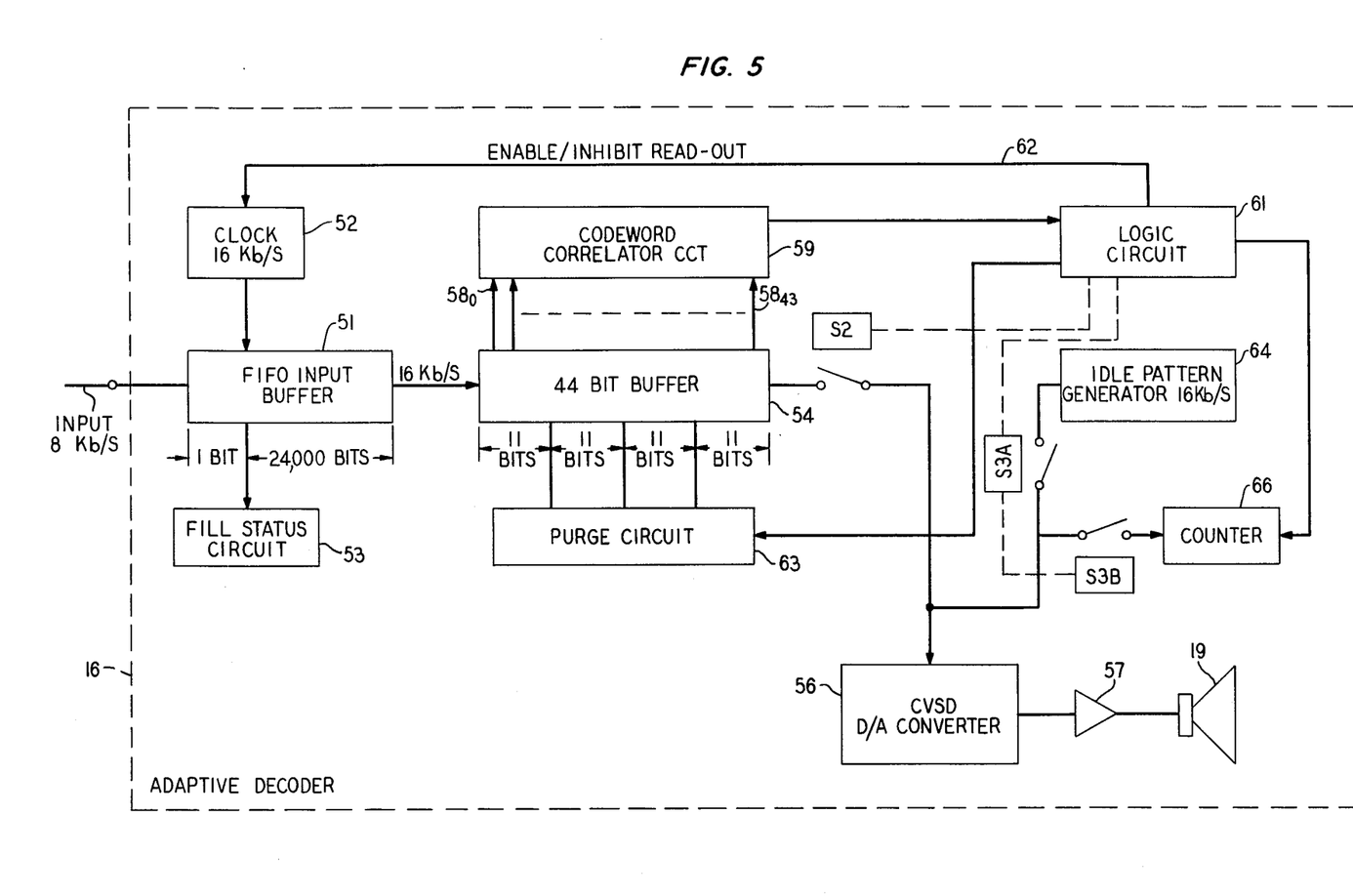
FIG. 5 is a block schematic diagram of the adaptive decoder shown in FIG. 1.

FIG. 5 depicts the circuitry of adaptive decoder 16 in greater detail. As shown, decoder 16 comprises a FIFO input buffer 51 having its input connected to the output of the 8 kb/s transmission facility 14. Buffer 51 has a capacity of 24,000 bits in the illustrative example and is connected to a 16 kb/s clock circuit 52. A fill status circuit 53 monitors the last bit position in buffer 51 to indicate when the buffer is filled. The output of buffer 51 is connected to the input of a 44-bit buffer 54, thence, via a normally closed electronic switch S2 to a CVSD Digital-to-Analog converter 56. The output of D/A converter 56 is connected, via some suitable audio amplifier 57, to transducer 19.

Each stage of buffer 54 is connected, via leads $58_0$ – $58_{43}$, to a code word correlator circuit 59. The output of correlator circuit 59 is connected to a logic circuit 61 which is connected, via an enable/inhibit lead 62, to clock 52. A purge circuit 63 is connected to each of the bit stages of buffer 54 to purge the up-to-four code words which may be stored therein. Purge circuit 63 is also connected to, and controlled by, logic circuit 61. An idle pattern generator 64 operating at the 16 kb/s rate is connected to CVSD D/A converter 56, via normally "open" switch S3A. A counter 66 is also connected to the output of buffer 54, via normally "open" switch S3B. Switches S2 and S3A and S3B are controlled by logic circuit 61.

Figure 6A:
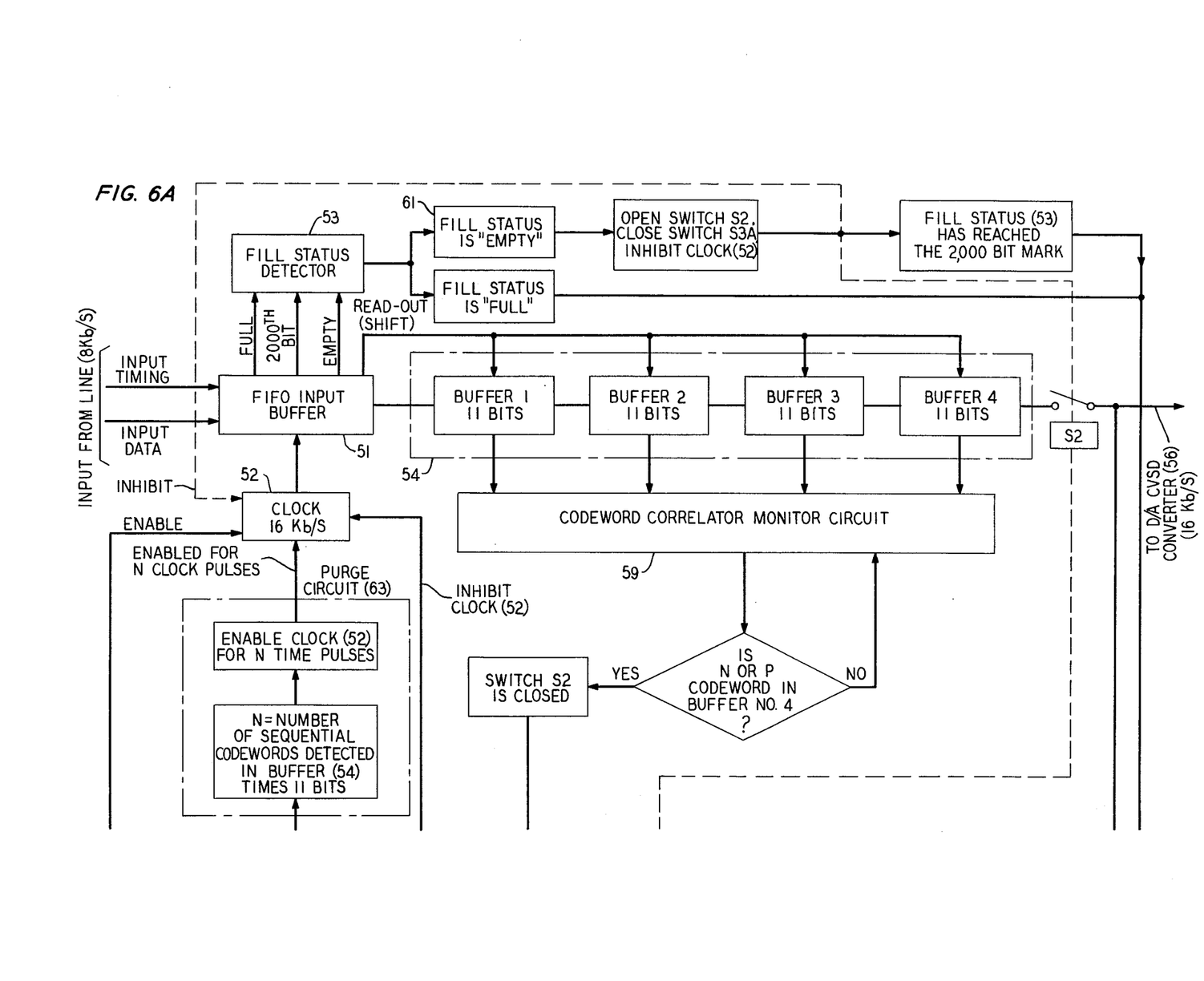
FIGS. 6A and 6B show a partially block schematic, partially functional flow diagram illustrating the operation of the decoder shown in FIG. 5.
Figure 6B:
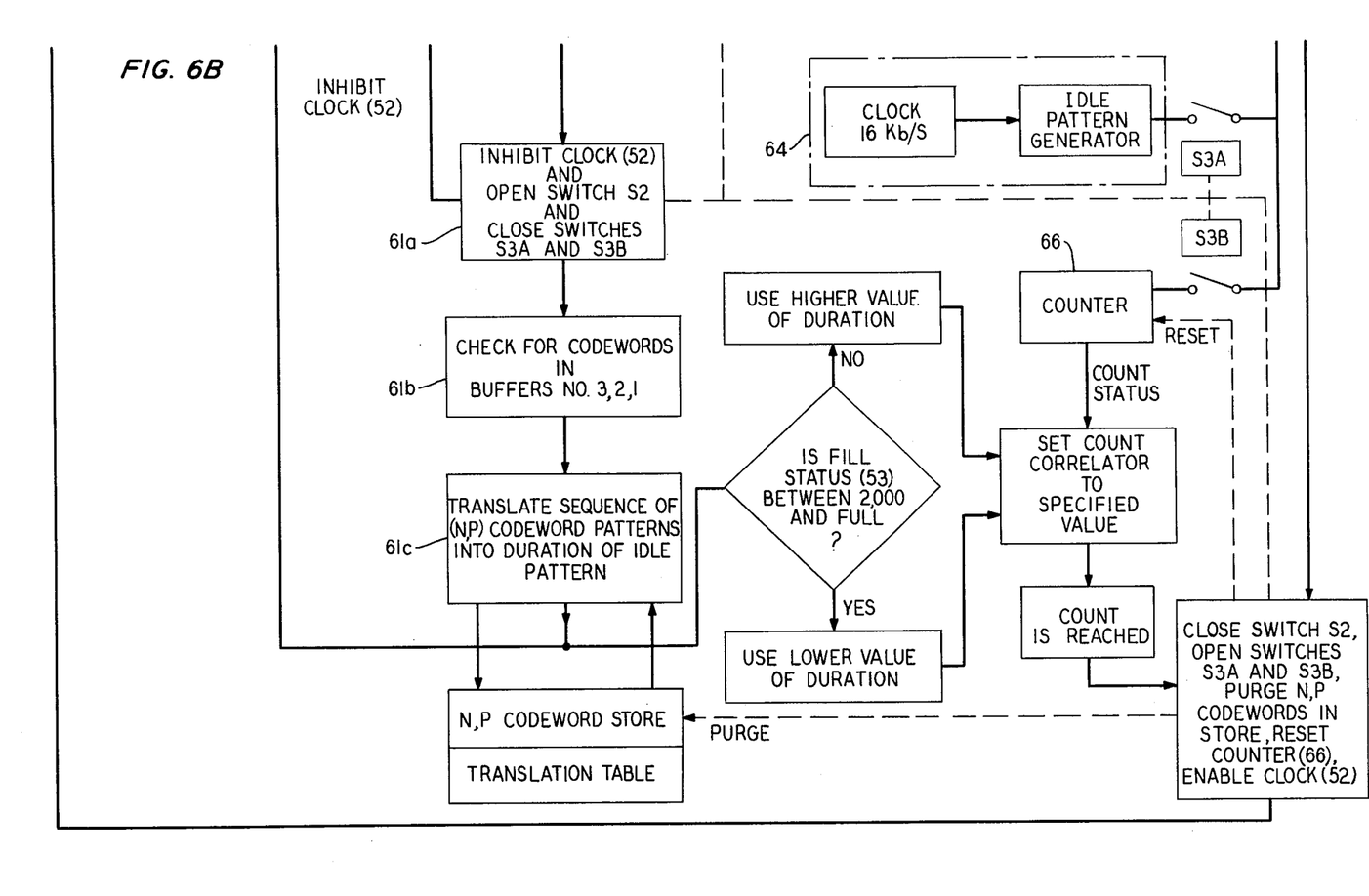
Figure 7A:
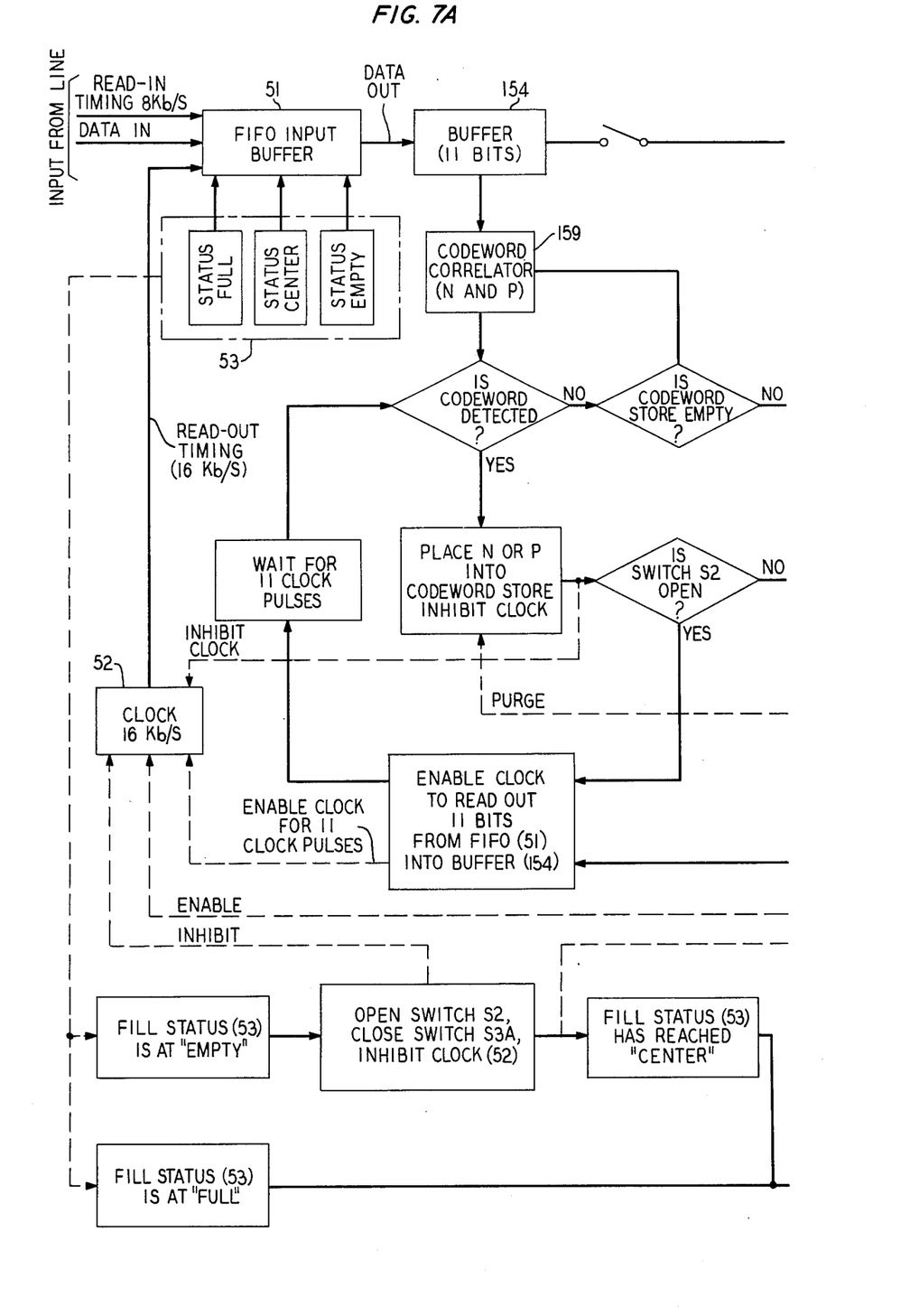
FIGS. 7A and 7B show a partially block schematic, partially functional flow diagram illustrating the operation of an alternate decoder according to the invention.
Figure 7B:
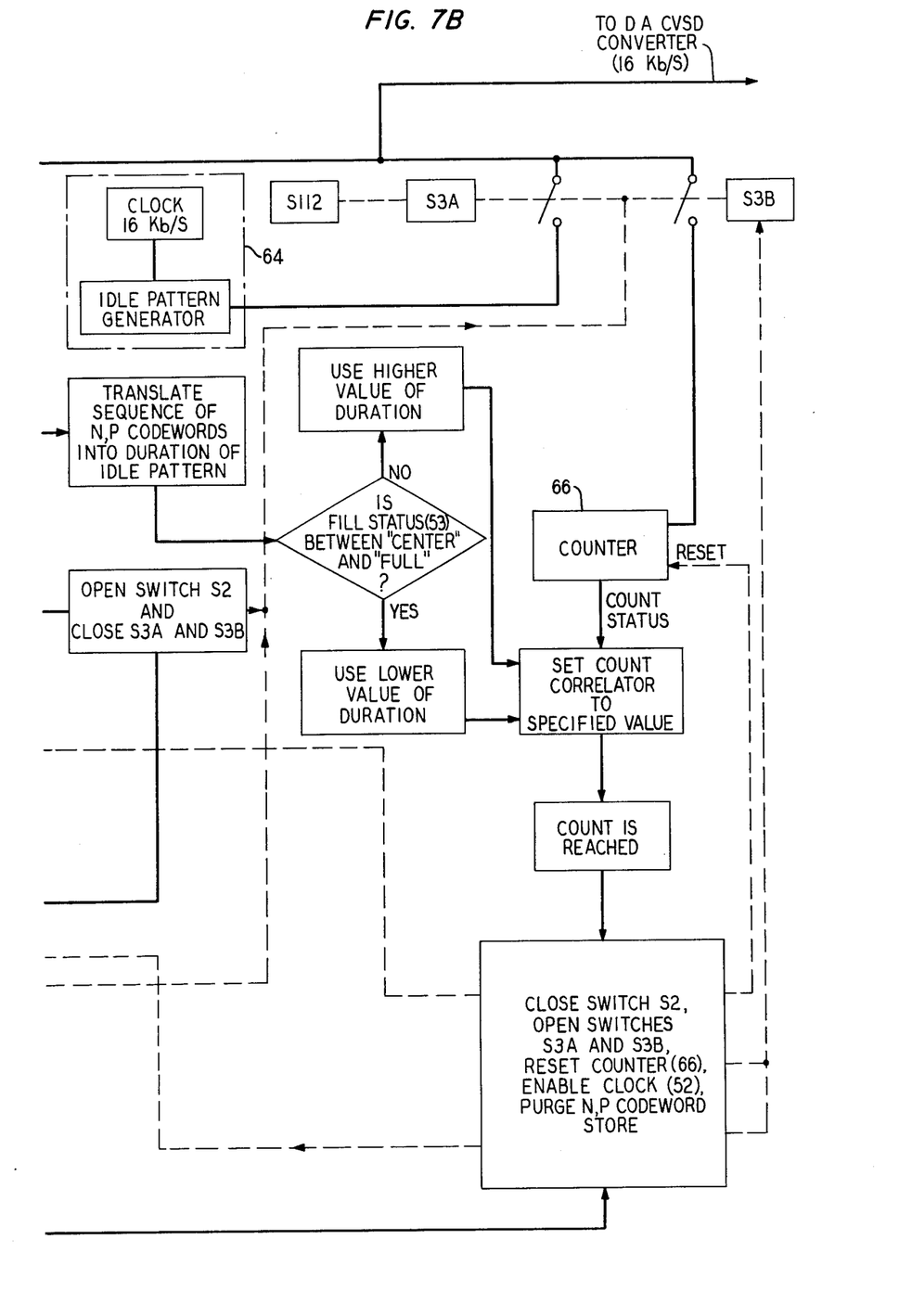
Figure 8:
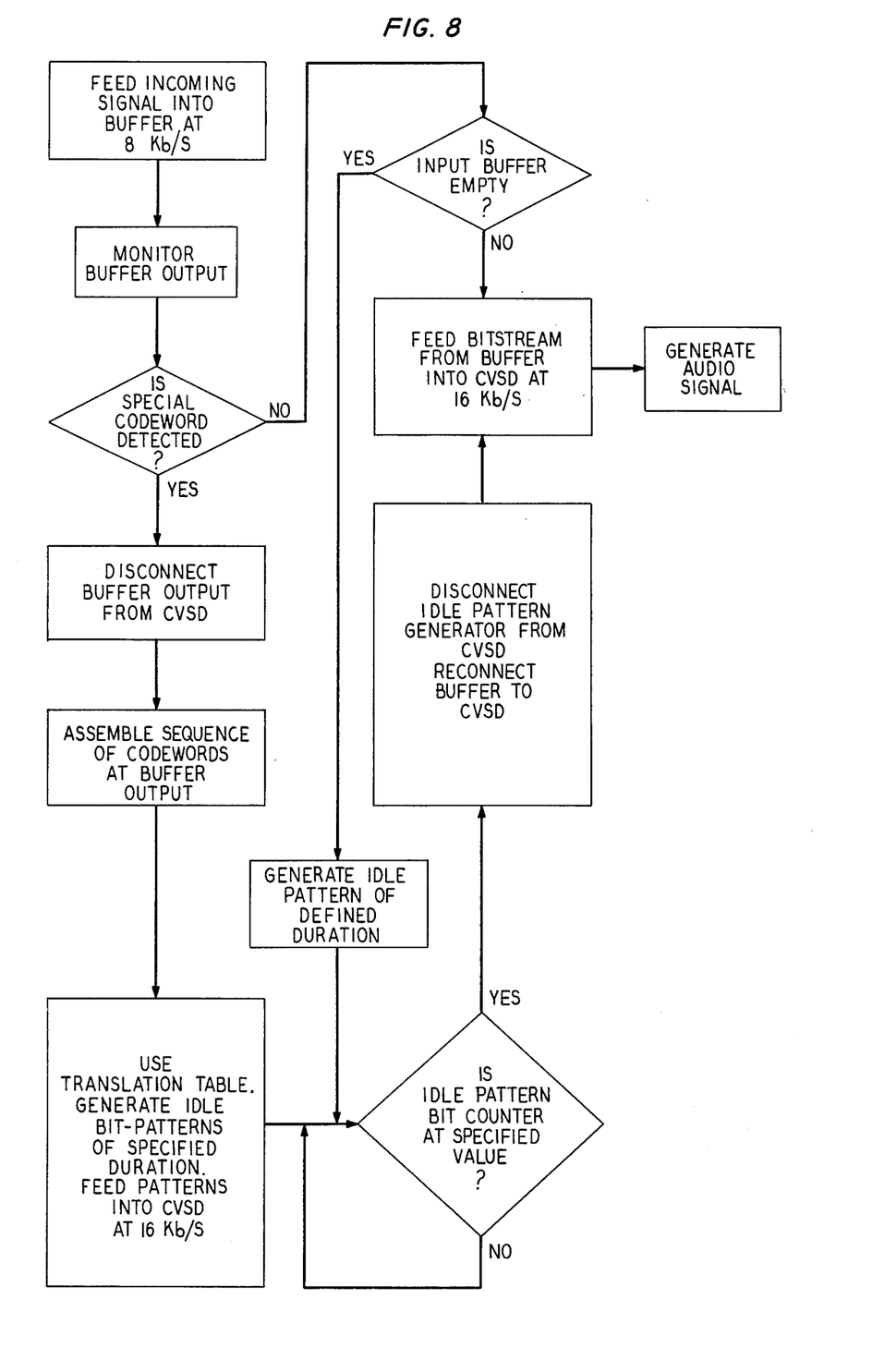
FIG. 8 is a flow-chart illustrating the processing steps that the digital bit stream undergoes in the decoder shown in FIGS. 5 and 6.

The operation of decoder 16 will now be described in detail. The explanation will be simplified if reference is made to the decoder flow diagram of FIG. 6 and to the flow chart of FIG. 8. (FIG. 7 is a decoder flow diagram of an alternative implementation and will be discussed later.)

As shown, decoder 16 receives the incoming line signal at the 8 kb/s rate and operates on that signal to provide an interface between it and the CVSD D/A converter which operates at 16 kb/s. More specifically, the incoming 8 kb/s line signal is applied to the input of FIFO input buffer 51. Buffer 51 is an "elastic" buffer of large bit capacity. The output of buffer 51, which is clocked at the 16 kb/s rate, is fed through buffer 54 (actually four, 11-bit buffers $54_a$–$54_d$) to D/A converter 56 to produce the desired analog voice signal.

This connection is broken, via switch S2, under two conditions. The first, which is extremely rare in practice, is when fill status circuit 53 signals logic circuit 61 that buffer 51 is empty. When this occurs, logic circuit 61 "closes" switches S3A and S3B to permit idle pattern generator 64 to generate an idle pattern of an arbitrary but predetermined time duration (4,000 bits in the illustrative embodiment). This bit sequence is fed into the CVSD converter 56 to give buffer 51 time to accumulate an adequate number of bits (e.g., 2,000) from the line before processing.

The second case, i.e., where a special 11-bit code word is detected in buffer $54a$, signals to the decoder that idle patterns of a defined duration must be fed into the CVSD converter in lieu of the special code word.

Correlator 59, which is associated with buffers $54a$ – $54d$, after detecting a correlation peak of magnitude "11" in buffer $54d$ and after halting the through-flow by signaling logic circuit 61 to "open" switch 52, checks:

2. the polarity of the special code word in buffer $54d$ (i.e., is the code word "P" or "N");

2. whether buffer $54c$ also contains a special code word of either "P" or "N" polarity;

3. if buffers $54d$ and $54c$ both contain code words, whether buffer $54b$ also contains a special code word of either "P" or "N" polarity; and 4. if buffers $54d$, $54c$ and $54b$ each contain code words, whether buffer $54a$ also contains a special code word of either "P" or "N" polarity.

After determination that buffer 54 contains from 1 to 4 code words, as well as determining their polarity, correlator 59 forwards the sequence of P/N's to logic circuit 61 which compares the sequence with the translation table of Table I. As previously discussed, the translation table defines the number of idle bit patterns (10101010 . . .) to be substituted for the sequence of special code words transmitted by the encoder, at the transmitting location.

Since the number of idle patterns is represented by a range, rather than a fixed value, the translation process uses the fill status of buffer 51 to determine whether to use the lower bound or the upper bound of the table entries. The fill status information from circuit 53 indicates whether the input buffer holds less than 2,000 bits or is more filled. If less than 2,000 bits are held in the input buffer the upper bounds of the table entries are used, and if more than half filled, the lower bounds are used. Obviously, this is only an approximation and will result in some arbitrary lengthening or shortening of quiet intervals, but the effect in most cases is not noticeable.

After logic circuit 61 has selected the appropriate table entry, idle pattern generator 64 is connected to D/A converter 56, via switch S3A, and the output bits of the generator are counted by counter 66 at the 16 kb/s rate. Meanwhile, the buffer 54 is advanced N steps to remove the special code words stored in it (N = number of special code words times 11 bits).

When counter 66 reaches the specified count, clock 52 for input buffer 51 is enabled, thus allowing the incoming bitstream to enter the buffers $54d$ – $54a$ and to proceed, via now-"closed" switch S2, into CVSD converter 56. Switches S3A and S3B are then "opened" and counter 66 is reset. Note that buffer 51 in the decoder and buffer 32 in the encoder are first-in, first-out buffers. That is, inputted bits (negative = space, positive = mark) "fallthrough" and assemble themselves at the output port in a first-in first-out sequence. This provides an elasticity of loading/unloading of the buffers in the context of the disclosed process.

FIG. 7 depicts the flow diagram of an alternative decoder according to the invention. As shown, the 44-bit buffer 54 of FIG. 6 is replaced by a single 11-bit buffer 154 and code word correlator 159 is reduced correspondingly to an 11-bit correlator. In order to check for the occurrence of sequential code words, buffer 154, after having detected one code word and having opened switch 112, is filled again with 11 bits from buffer 51 by 11 clock pulses from clock 52, whereupon the code word correlator 159 again checks for the presence of another code word. If another code word is detected, the process is repeated one or two times to determined the occurrence of a third or fourth code word. Subsequent procedures are substantially identical as described above for FIG. 6 and, thus, need not be discussed in detail.

One skilled in the art may make various changes and substitutions to the layout of parts shown without departing from the spirit and scope of the invention.

What I claim is:

1. A method of transmitting an analog information signal from a first to a second location, which comprises the steps of:
    converting said analog information into a digital information signal using delta modulation at a first bit rate;
    monitoring said digital information signal for idle bit patterns which are representative of momentary interruptions in the information content of said analog information signal;
    substituting at least one coded bit pattern for each idle bit pattern so detected which exceeds a predetermined interval length with the coded bit patterns having idealized correlation properties and also indicating in which range the number of bits in the idle bit pattern falls, selected from predetermined ranges of unequal length which increase in a nonlinear manner;
    buffering said digital signal and interspersed coded bit patterns; and then
    transferring said buffered digital signal and interspersed coded bit patterns at a second bit rate into a digital transmission facility operating at said second bit rate which is substantially lower than said first bit rate.

2. A method of decoding a coded digital information signal transmitted from a first to a second location over a digital transmission facility operating at a second bit rate, said digital information signal having priorly been converted from an analog information signal using delta modulation at a first bit rate substantially higher than said second bit rate, said coded signal comprising a digital signal representative of information and interspersed coded bit patterns representative of momentary interruptions in said information with the coded bit patterns having idealized correlation properties and also indicating in which range the length of the momentary interruption interval falls, selected from predetermined ranges of unequal length which increase in a nonlinear manner, which comprises the steps of:
    buffering the digital signal and coded bit patterns received from the output of said digital transmission facility at said second bit rate;
    forwarding the buffered digital signal at said first bit rate to a digital-to-analog converter;
    monitoring the output of said digital transmission facility to detect the presence of said coded bit pattern;
    interrupting the transfer of digital signals into said digital-to-analog converter each time that a coded bit pattern is so detected;
    generating an idle bit pattern having a number of bits within the range determined by the information contained in the coded bit patterns detected in said monitoring step;
    forwarding said idle bit pattern to said converter while said digital signal transfer remains interrupted;
    restarting the flow of digital signals to said digital-to-analog converter until the next coded bit pattern is detected; and
    reconverting, in said digital-to-analog converter, the digital signal and interspersed idle bit patterns into said analog signal.

3. Apparatus for transmitting an analog information signal from a first to a second location which comprises:
    a. at said first location:
    means for converting said analog information signal into a digital information signal at a first bit rate using delta modulation;
    means, responsive to each momentary interruption in the information content of said analog signal which exceeds a predetermined interval, for generating at least one coded bit pattern which is representative of the digital signal output from said converting means during said momentary interruption with the coded bit patterns having idealized correlation properties and also indicating in which range the length of the momentary interruption interval falls, selected from predetermined ranges of unequal length which increase in a nonlinear manner;
    means for substituting said coded bit pattern for the digital signal output from said converting means during said momentary interruption; and
    means for transmitting said digital signal and interspersed coded bit pattern to said second location at a second bit rate which is substantially less than said first bit rate; and
    b. at said second location:
    means, responsive to the output of said transmitting means, for detecting said coded bit patterns and generating a bit sequence substantially corresponding to the digital signal output from the converting means at said first location during said momentary interruption;
    means, connected to the output of said transmitting means, for converting said digital signal back into said analog signal, said converting means operating at said first bit rate; and
    means, responsive to the output of said detecting means for temporarily halting the transfer of digital information from said transmitting means to said converting means whenever a coded bit pattern is detected and substituting therefor the bit sequence generated by said detecting means, whereby said analog information signal is recreated at said second location with substantially total fidelity.

4. An adaptive encoder which comprises:
    means for receiving a delta modulated digital input signal, at a first bit rate, which is representative of an analog information signal of a type that includes occasional but randomly spaced intervals of substantially zero information content;
    means, connected to said receiving means, for detecting a bit pattern in said digital input signal representative of a zero information content interval exceeding a predetermined interval;

a first, "first-in, first-out", buffer connected to said receiving means for storing said digital input signal;

means, responsive to said detecting means, for interrupting the flow of binary information from said receiving means to said first buffer each time that said detecting means detects a bit pattern representing a zero information content of the original analog signal;

means, responsive to the output of said detecting means, for generating at least one coded bit pattern which is representative of the zero information content bit pattern which the coded bit patterns having idealized correlation properties and also indicating in which range the length of the zero information content interval falls, selected from predetermined ranges of unequal length which increase in a nonlinear manner;

means for feeding said at least one coded bit pattern to said first buffer while the flow of binary information from said receiving means is interrupted;

means for restarting said flow of binary information after said at least one coded bit pattern has been stored in said first buffer; and means for reading-out the digital input signal and interspersed coded bit patterns stored in said first buffer at a second bit rate which is substantially less than said first bit rate.

5. The encoder according to claim 4 further comprising:

a second buffer connected between said receiving means and the input to said first buffer, said second buffer having a bit capacity corresponding to said predetermined interval of the duration of said zero information content bit pattern, comprising several samples of the analog information.

6. The encoder according to claim 4 further comprising:

means, responsive to the output of said detecting means, for counting the number of bits in said zero information content bit pattern, and said coded bit pattern generating means comprising:

means for storing a plurality of coded bit patterns each having idealized correlation properties;

means, responsive to the count determined by said counting means, for selecting a particular sequence of said coded bit patterns; and wherein said detecting means includes means to convert the digital signal to the original analog signal and monitors the resulting analog signal for being within a given threshold value from the zero level to determine said zero information content.

7. An adaptive decoder which comprises:

means for receiving a digital input signal, at a second bit rate, said input signal comprising a digital signal which is a delta modulation representation of an analog information signal of a type that includes occasional but randomly spaced intervals of substantially zero information content, the portions of said digital signal representative of said zero information content intervals having priorly been replaced by at least one coded bit pattern if they exceed a predetermined threshold length with the coded bit patterns having idealized correlation properties and also indicating in which range the length of the zero information content interval falls, selected from predetermined ranges of unequal length which increase in a nonlinear manner;

a first, "first-in, first-out-38 buffer connected to said receiving means for storing said digital input signal;

means, connected to the output of said first buffer, for detecting said at lease one coded bit pattern;

means, connected to said detecting means, for forwarding said digital input signal at a first bit rate to a digital-to-analog converter for conversion to said analog information signal;

means, responsive to said detecting means, for interrupting the flow of the digital input signal to said forwarding means each time that a coded bit pattern is detected;

means, connected to said forwarding means, for generating a bit stream substantially representative of the zero information content represented by said at least one coded bit pattern for transmission to said digital-to-analog converter, while the flow of said input signal remains interrupted; and means for restarting the flow of the digital input signal to said forwarding means after said bit stream has been transmitted.

8. The decoder according to claim 7 wherein said detecting means comprises:

a second, n-stage, "first-in, first-out" buffer interposed between said first buffer and said digital-to-analog converter; and a correlation detector having inputs connected to each stage of said n-stage second buffer.

9. The decoder according to claim 8 wherein each of said coded bit patterns is n bits long and has idealized correlation properties, and said n-stage, second buffer includes means for detecting said coded bit pattern and advancing said buffer in steps of n bits to detect up to four sequentially received n-bit encoded bit patterns.

10. The decoder according to claim 8 wherein each of said coded bit patterns is n/4 bits long, has idealized correlation properties, and said n-stage second buffer can detect up to four of said coded bit patterns accumulated in the n-bit buffer.

11. The decoder according to claim 8 wherein said bit stream generating means comprises:

a logic circuit connected to said correlation detector for determining the duration of said zero information content bit stream;

a bit generator responsive to said logic circuit for generating a continuous train of binary digits of the predetermined zero information pattern; and a bit counter connected to the output of said bit generator and to said logic circuit for interrupting the output of said bit generator when said bit stream has attained the desired duration.

12. The decoder according to claim 11 including a logic circuit wherein said determination of the duration of said zero information content bit stream is adaptively dependent on the number of the information bits being buffered in the decoder at a given instant, such that said durations of zero information content bit stream is lengthened in a predetermined way if said number of stored information bits is low, and shortened if said number is high.

* * * * *